(No Model.)

G. W. BOWERS & T. J. THOMPSON.
CARPET STRETCHER.

No. 293,410. Patented Feb. 12, 1884.

WITNESSES:
Fred. G. Dieterich.
Arthur L. Morsell.

George W. Bowers
Thomas J. Thompson
INVENTORS.
By Louis Bagger & Co.
ATTORNEYS.

UNITED STATES PATENT OFFICE.

GEORGE WASHINGTON BOWERS AND THOMAS JEFFERSON THOMPSON, OF BEAVER FALLS, PENNSYLVANIA.

CARPET-STRETCHER.

SPECIFICATION forming part of Letters Patent No. 293,410, dated February 12, 1884.

Application filed November 23, 1883. (No model.)

*To all whom it may concern:*

Be it known that we, GEORGE W. BOWERS and THOMAS J. THOMPSON, citizens of the United States, and residents of Beaver Falls, in the county of Beaver and State of Pennsylvania, have invented certain new and useful Improvements in Carpet-Stretchers; and we do hereby declare that the following is a full, clear, and exact description of the invention, which will enable others skilled in the art to which it appertains to make and use the same, reference being had to the accompanying drawings, which form a part of this specification, and in which—

Figure 1:
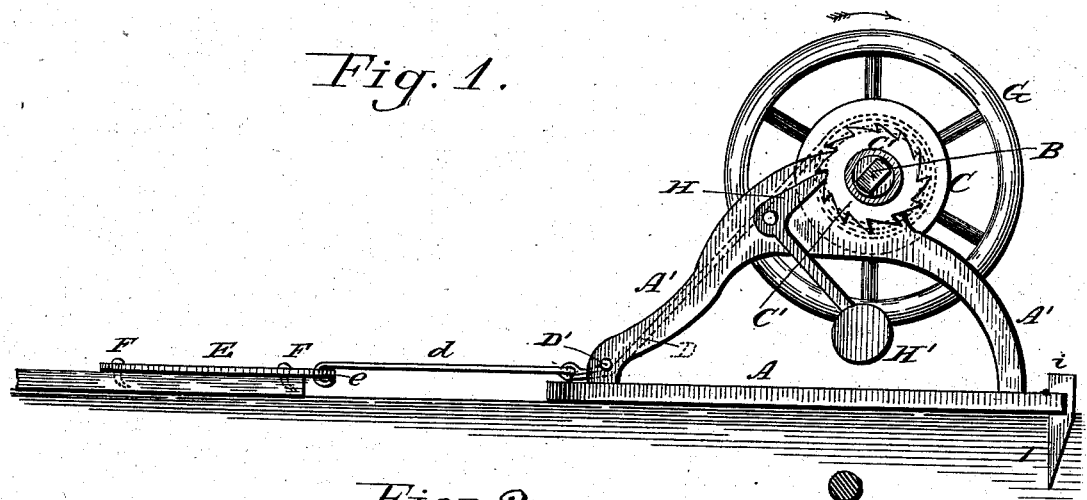
Figure 2:
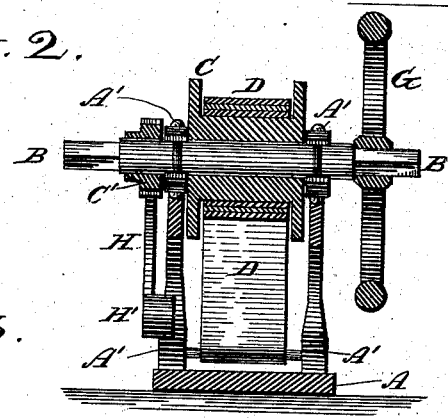
Figure 3:
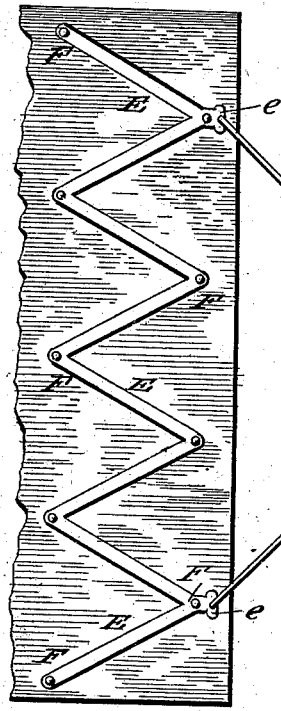

Figure 1 is a side elevation of our improved carpet-stretcher. Fig. 2 is a transverse vertical section, and Fig. 3 is a plan of the toothed bar which is fastened into the carpet when the same is to be stretched.

Similar letters of reference indicate corresponding parts in all the figures.

Our invention has relation to carpet-stretchers; and it consists in the improved construction and combination of parts of the same, which will be hereinafter more fully described.

In the accompanying drawings, A denotes the bed or base-plate of the stretcher, which is provided with standards A' on opposite sides, and has a downward-projecting spike or dog, I, at one end, adapted to be driven into the planks of the floor by a blow with a hammer or mallet upon its head *i*. The standards A' form bearings for a flanged spool or roller, C, which has on one side a ratchet-wheel, C', adapted to engage the dog H, which has a counterpoise, H', at its lower end.

B denotes the shaft of the spool or roller C, which is squared to fit the central aperture of a hand-wheel, G, for rotating the spool; or, instead of this hand-wheel, a spanner, key, or lever may be used adapted to fit the squared end or ends of the shaft for the purpose of rotating the same. Around the spool, and fixed thereon between its flanges, is a strap of webbing, leather, or other suitable material, D, the free end of which passes under a cross-bar or guide-bar, D', in the forward end of the frame.

E is the stretcher-bar, which is of metal, of a zigzag shape, as shown in Fig. 3, and provided with teeth or hooks F at the apex of its angles. This bar is provided with eyes or loops *e*, for the attachment of a bifurcated link or strap, *d*, which is fastened to the free end of the main strap D by its middle.

It is obvious that a cord, chain, or wire cable may be used instead of the flat strap or band D shown in the drawings, although we prefer to use a flat strap or band, because it will wind more easily and smoothly upon the spool or drum in operating the machine.

From the foregoing description, taken in connection with the drawings, the manner of using our improved carpet-stretcher will readily be understood without requiring further explanation. The hooks F are inserted into the carpet to be stretched, and by constructing the stretcher-bar in a zigzag shape it will be seen that the hooks do not come in line with one another, but alternate, so as to distribute the pull upon the carpet and not cause the same to come upon one of the strands of the warp-threads or web-threads only, which would be apt to tear the carpet or to displace the strands of the fabric. By turning the drum in the direction of the arrow the strap D will be wound around it, thus drawing the carpet taut and trim, the roller being prevented from slipping back by the dog H, which engages the teeth or notches of the ratchet-wheel C'.

Having thus described our invention, we claim and desire to secure by Letters Patent of the United States—

1. The combination of the frame A A', having dog I and guide-bar D', flanged roller C, having ratchet-wheel C' and shaft B, means for rotating the roller in its bearings, pawl or dog H H', strap D, bifurcated strap *d*, and stretcher-bar E, of a zigzag shape, and provided with the teeth or hooks F and loops *e*, substantially as set forth.

2. In a carpet-stretcher, the stretcher-bar E, of a zigzag shape, and provided with teeth or hooks F and loops *e*, for its attachment to the stretching machine or mechanism, substantially as set forth.

In testimony that we claim the foregoing as our own we have hereunto affixed our signatures in presence of two witnesses.

GEORGE WASHINGTON BOWERS.
THOMAS JEFFERSON THOMPSON.

Witnesses:
JOSEPH J. KENNEDY,
ROBERT A. BOLE.